United States Patent [19]

Smith et al.

[11] Patent Number: 5,042,622
[45] Date of Patent: Aug. 27, 1991

[54] SHOPPING CART FOOT BRAKE ASSEMBLY

[76] Inventors: Leonard Smith, 2042 Harkness, Cincinnati, Ohio 45225; Ralph L. Powers, 4858 Hawaiian Ter., Cincinnati, Ohio 45223

[21] Appl. No.: 526,658

[22] Filed: May 22, 1990

[51] Int. Cl.[5] .............................................. F16D 66/00
[52] U.S. Cl. .................................... 188/1.12; 188/19; 188/21; 188/29; 188/74
[58] Field of Search ...................... 188/1.12, 19, 21–22, 188/29, 83, 31, 2 R, 74; 280/33.994

[56] References Cited

U.S. PATENT DOCUMENTS

| | | | |
|---|---|---|---|
| 3,112,121 | 11/1963 | Hummer | 280/33.994 |
| 3,117,653 | 1/1964 | Alther | 188/29 |
| 3,458,015 | 7/1969 | Collins et al. | 188/29 |
| 3,942,608 | 3/1976 | Frank et al. | 188/1.12 |
| 4,018,449 | 4/1977 | Anderson | 188/29 X |

*Primary Examiner*—Douglas C. Butler

[57] ABSTRACT

A shopping cart has a foot brake assembly added as an improvement. The assembly comprises a shopping cart caster frame variable length mounting bracket with a worm clamp for mechanically attaching the brake housing and subsequent brake assembly to the shopping cart caster frame. The brake mechanism itself is comprised of a toggle pedal, connector arms, a brake arm, a brake foot travel adjuster rod, a brake foot, aligning and lubricating spacers, as well as required tension pins. The pedal is pivotably attached to the connector arms and pivotably attached to the brake housing. The connector arms are pivotably attached to the brake arm which is pivotably attached to the brake housing. the brake foot travel adjuster rod is screwed into the brake arm and is bonded to the brake foot. The brake foot engages the shopping cart caster wheel when the toggle pedal is depressed by a downward force applied by the operator's foot to the rear portion of the top surface of the toggle pedal. The brake foot disengages the shopping cart caster wheel when a downward force is applied by the operator's foot to the forward portion of the upper surface of the toggle pedal.

4 Claims, 3 Drawing Sheets

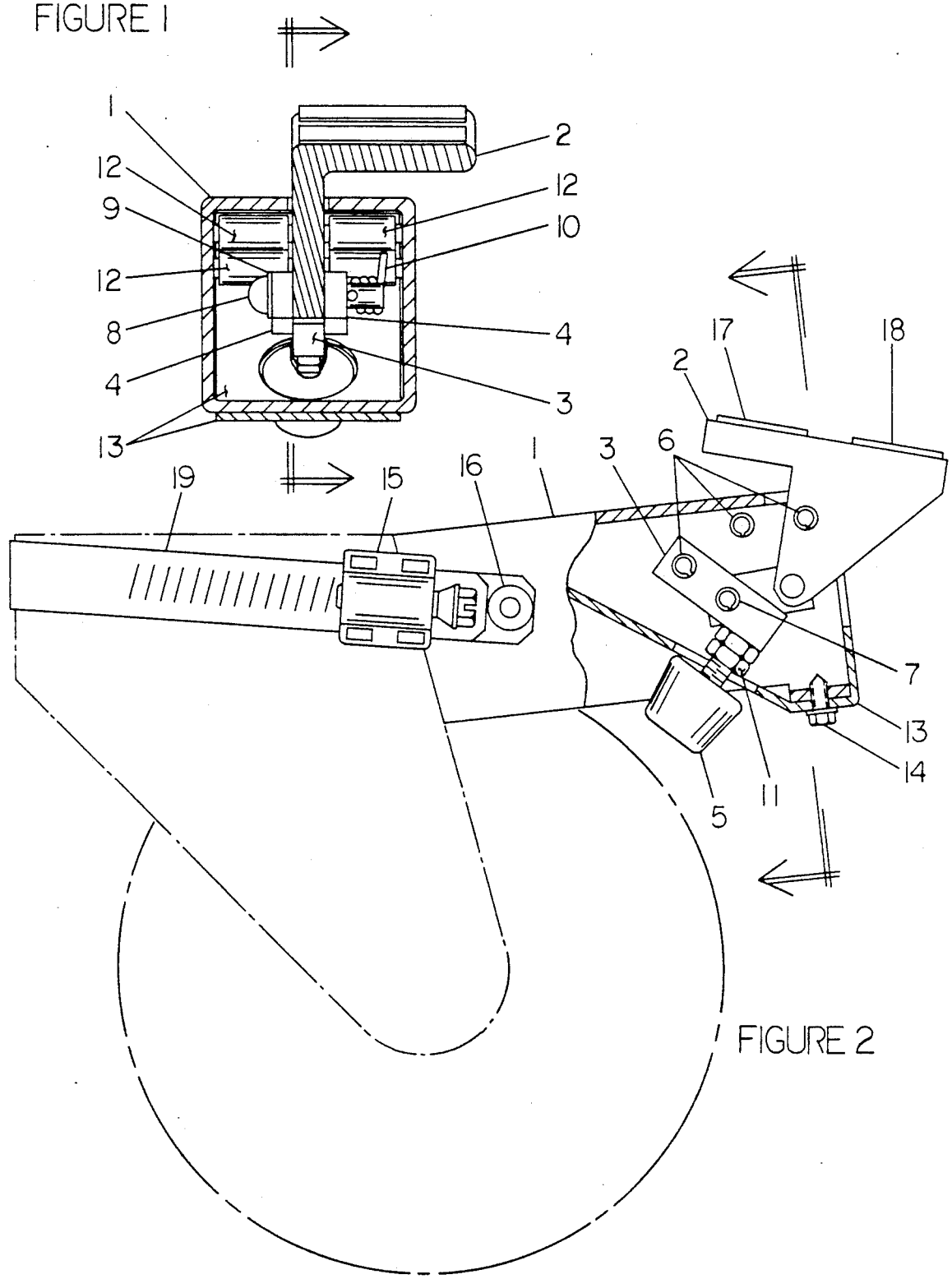

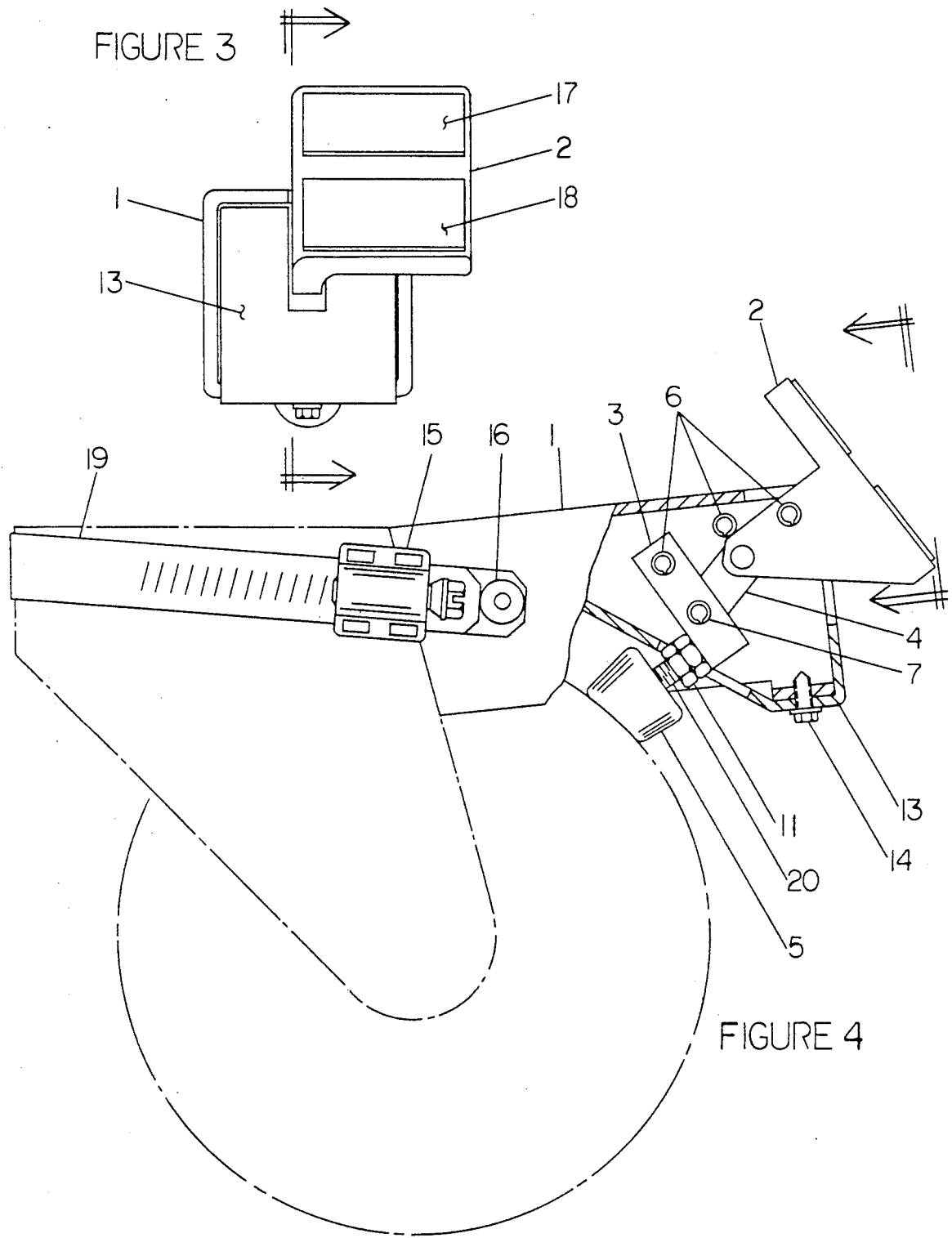

SHOPPING CART FOOT BRAKE ASSEMBLY

This invention relates to shopping carts. More particularly, the invention relates to augmentation of the control of shopping carts by using a foot activated caster brake assembly.

BACKGROUND OF THE INVENTION

Modern supermarkets and discount stores with large adjoining parking lots are very commonplace. Typically, most customers will leave the market or store with their bagged items in a shopping cart. These items will be transported in the cart to a parked automobile in the parking lot and there transferred to the automobile. Users of the cart often damage their own automobile, because the cart can not be properly stabilized while it is being unloaded. The cart will roll into scrape, and or dent an automobile. After which the shopping cart is to be placed in a cart corral, if such a corral is at hand or conveniently available. Generally the corral is to far away and the cart is left in the parking lot until it is retrieved and stored or placed service by store personnel.

A significant amount of property damage and occasional personal injury occurs as a result of the abandonment and the storage of shopping carts in or near parking lots. The cart can be bumped or blown into motion. This rolling is accelerated by the slope of the parking lot empowering the cart to cause considerable damage upon impact.

These types of problem are particularly acute in those parking lots which are steeply inclined either because of hilly topography or because of drainage requirements.

Others have recognized cart control problems associated with unrestrained shopping carts in parking lots and have attempted to remedy the situation. For example, U.S. Pat. Nos. 3,112,121 and 3,458,015 disclose carts which have been equipped with safety brakes. However, any shopping cart brake must be economical, easy to install, and even easier to operate.

The brake system must provide durable operation with minimal maintenance and not adversely effecting cart control activities. Above all it must return significantly more benefits in reduced claims and customer goodwill than potential liabilities before the retailer will incur the added expense a brake system is bound to entail. Additionally, any such brake system must not require the alteration of the current methods and equipment necessary to produce the cart or its casters. Manufactures are reluctant to alter their production methods or tools to accommodate braking systems.

All other shopping cart brake mechanisms suffer in one manner or another from these limitations. The result is that there are no cart brakes widely used in the United States. American retailers, cart manufactures, and their insurance companies are losing tens of millions of dollars annually in cart involved accidents which can be eliminated by a market acceptable shopping cart brake system.

There is an unmet market need for a shopping cart brake system which is economical to produce, easy to install, use, and durable enough to carry out its function.

This braking system can be factory installed after cart assembly or can be retrofitted to a retailer's existing fleet. This assembly has a minimum of parts for economy and efficient operation. The assembly is easy to install, easy to use and very reliable.

SUMMARY OF THE INVENTION

A shopping cart comprised of a frame with a basket for receiving articles and a set of wheels is improved with a foot brake assembly. The brake assembly is comprised of a variable length mounting bracket for affixing of the caster specific brake housing to the shopping cart caster. Systematically mounted within the brake housing are a toggle pedal with a lever portion protrusion, a connector arm set, a brake arm, a hinge spring, a brake foot adjuster rod, a brake foot, required tension pins, and ultra high molecular weight polyethylene spacers for alignment and lubrication purposes.

The connector arm set has the pedal lever portion pivotably attached at its first end and the brake arm pivotably attached at its second end. The brake arm is also pivotably attached at approximately ¾ of its length to the brake housing. The first end of the brake foot travel adjuster rod is threaded into the brake arm at the brake arm's second end. The brake foot travel adjuster rod's second end is statically connected to the brake foot.

The mechanism works when a downward force is exerted on the top rear portion of the toggle pedal. The force is transmitted through the pedal lever protrusion portion to the connector arms, causing the brake arm to pivot, driving the brake foot travel adjuster rod downward, forcing the brake foot to frictionally engage the wheel. During operation the ultra high molecular weight polyethylene spacers not only maintain proper alignment of the parts, but also lubricates the mechanism at the stress points.

BRIEF DESCRIPTION OF THE DRAWINGS

FIG. 1 section A—A is a rear view of the brake assembly with a transparent dirt shield and the brake disengaged.

FIG. 2 view B—B is a left side view of the brake assembly as mounted on a caster with a cut away of the housing and the brake disengaged.

FIG. 3 view C—C is a rear view of the brake assembly in the locked position with a non-transparent dirt shield and the brake engaged.

FIG. 4 view D—D is a left side view of the brake assembly as mounted on a caster with a cut away of the housing and the brake engaged.

DETAILED DESCRIPTION OF THE INVENTION

Figures 5, 6:
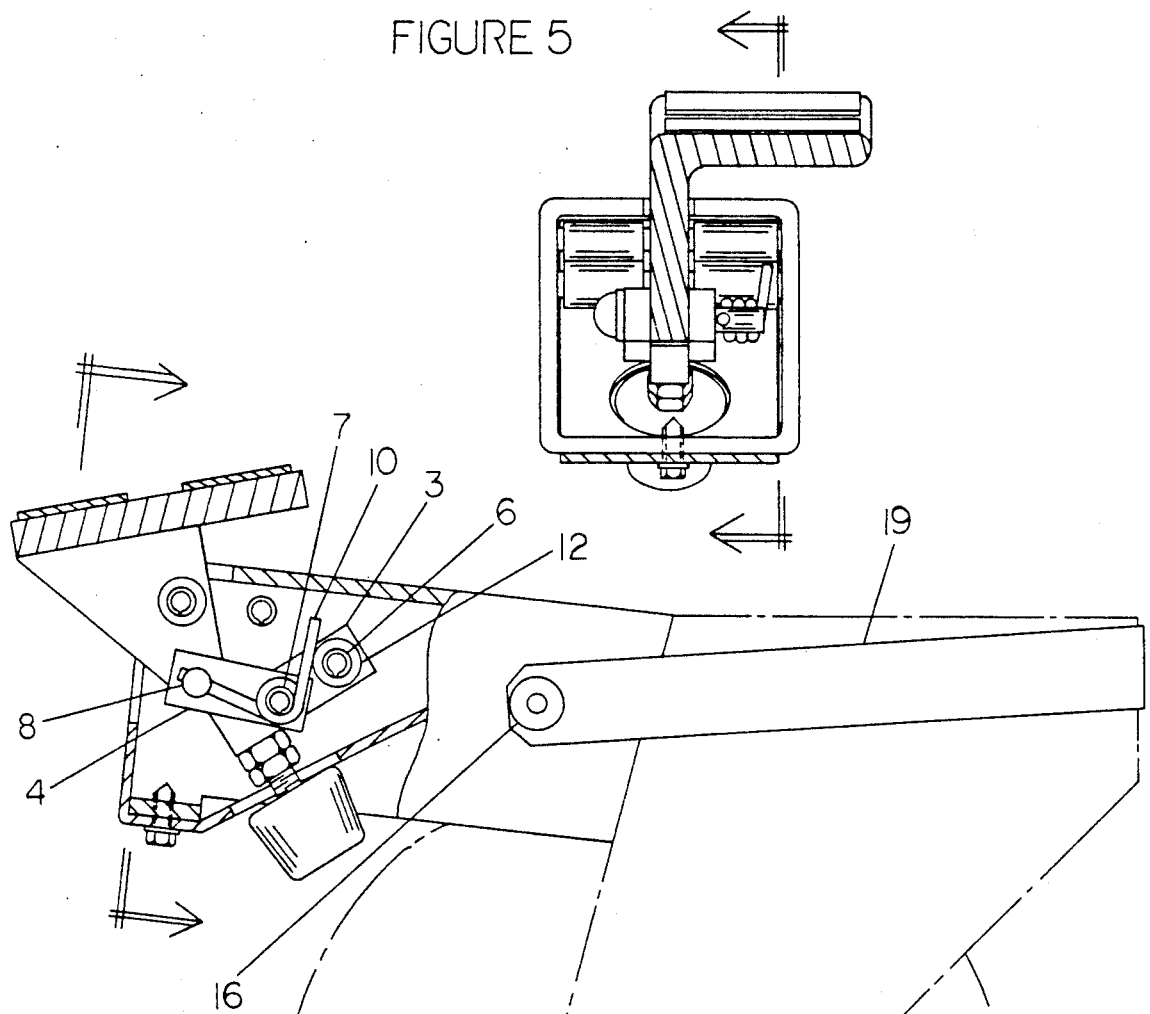
FIG. 5 view E—E is a rear view of the brake assembly depicting the bottom portion of the dirt shield with the brake foot passing through it in the disengaged position.
FIG. 6 view F—F is a right side view of the brake assembly with the housing cut away in the disengaged position as mounted on a caster.

The foot brake assembly which comprises this invention is shown in FIG. 2 as mounted to the shopping cart caster frame in close association with the right rear caster wheel. A variable length bracket system comprised of a variable length strap (13) and a worm clamp (14) affixes the brake housing (1) to the particular caster. Any other attachment means can be used for attaching each brake housing to the caster frame including bolts, welds, or the mounting bracket and worm clamp, as shown. The exact dimensions of the mounting bracket, including the length and shape of the brake housing will depend on the particular caster frame configuration. Positioning of the brake housing is such that the nesting action of a series of shopping carts is not impeded.

The mounting bracket FIG. 6 (19) is attached to the brake housing at FIG. 6 item (16), wrapping around and frictionally engaging the caster frame and is inserted into the worm clamp FIG. 2 item 15. The worm clamp is attached to the brake housing at FIG. 2 item (16). In effect, the mounting bracket system provides the brake housing the capacity to be mounted to the caster in the appropriate alignment with the caster wheel.

The operating mechanism FIG. 1 is comprised of a pedal (2), connector arms (4), a brake arm (3), a brake foot FIG. 2 (5), and the associated pins (6), high molecular weight plastic spacers FIG. 1 (12), and hinged (retraction) spring (10). The toggle pedal comprises a substantially flat pad dimensioned to receive a force from the operator's foot and transmit it along the lever portion protrusion from the underside thereof. The lever portion of the pedal is pivotably attached to the brake housing FIG. 2 (6), as well as being pivotably attached to the connector arms FIG. 6 (8). The connector arms are comprised of two elongated plates pivotably connected to the lever portion of the pedal at one end and pivotably connected to the brake arm at the other end. The brake arm is an elongated member pivotably attached at its first end to the brake housing and also pivotably attached at ¾ of its length to the connector arms. At the second end of the brake arm is a tapped cavity which the brake foot travel adjuster rod FIG. 4 (20) is threaded into and secured by a lock nut FIG. 4 (11). The brake foot is attached to the opposite end of the brake foot travel adjuster rod FIG. 4 (5) in a manner to frictionally engage the wheel when foot pressure is applied by the operator to the top rear portion of the toggle pedal. The brake foot is retracted by a downward force being applied by the operator's foot to the top frontal portion of the brake toggle pedal and is assisted by the tension of the retraction spring. The brake pedal's action is a toggle action to both engage and disengage the brake mechanism.

The brake assembly can be readily attached to a conventional shopping cart. The mounting bracket system can be dimensioned to fit a particular shopping cart. Consequently, the brake assembly is readily retrofitted to many shopping carts due to the fact the mounting bracket in conjunction with the brake housing can be configured to fit the particular cart's caster frame.

In operation, a shopping cart is wheeled to the customer's automobile. The brake assembly is activated by the operator's foot applying a downward force to the top rear portion of the toggle pedal. This downward force is transmitted through the lever portion protrusion of the pedal, through the connector arms, and the brake arm. The force in turn moves the brake foot travel adjuster rod to position the brake foot to frictionally engage the cart's wheel, impeding the wheel's capacity to roll. The brake locks in the engaged position. It is released by a second downward force applied by the operator's foot to the top front portion of the pedal reversing the sequence of the brake mechanism.

While the invention has been describe with specific references to the drawings, it should be understood various and obvious modifications can be made without departing from the scope of coverage of the following claims.

What is claimed is:

1. The improvement to a shopping cart being a mechanically attaching foot activated caster brake assembly for stabilizing the shopping cart when it is being unloaded, and preventing an unattended shopping cart whether said cart is abandoned in the parking lot or nested in the customary storage arrangement from rolling about in the parking lot due to the force of wind or the steepness of the parking lot drainage grade, said assembly comprising;

a. a toggle pedal having a flat surface with a lever portion protrusion from the undersurface thereof is pivotably mounted at the midpoint of said lever portion protrusion within a brake housing by a tension roll pin passing through the sides of said brake housing and the aligning and lubricating ultra high molecular weight plastic spacers which are buttressed between the inside walls of said brake housing and the sides of said lever portion protrusion from the underside of said toggle pedal;

b. a pair of connector arms having first and second ends where said first end of said pair of connector arms is pivotably attached to the end of said lever portion protrusion from said toggle pedal, with said lever portion protrusion between each element of said pair of connector arms, said lever protrusion is insulated from direct contact with either element of said connector arm set by lubricating ultra high molecular weight spacers; said pivotably attachment is maintained by a clevis pin having a head and shaft and is secured in position on said shaft by the arm of a hinge spring which passes through a cavity in the shaft of said clevis pin locking said connector arms, spacers, and lever portion protrusion into the assemblage;

c. a brake arm having first and second ends with said first end thereof being drilled and tapped through its height, at approximately ½ of its length said brake arm is pivotably attached between the second end of said pair of connector arms, said brake arm is insulated from direct contact with said connector arms by lubricating ultra high molecular weight spacers, said second end of said brake arm is pivotably attached to said brake housing by a tension pin which extends between the two sides of said brake housing passing through an aligning and lubricating ultra high molecular weight spacer, said brake arm at its second end, and another ultra high molecular weight aligning and lubricating spacer;

d. a brake foot travel adjuster rod having first and second ends with its shaft being threaded, where said first end thereof is screwed into said first end of said brake arm where it is drilled and tapped;

e. a brake foot having first and second ends, where said first end thereof is attached to said second end of said brake foot travel adjuster rod, and where said second end of said brake foot is able to frictionally engage a caster wheel;

f. said brake foot obstructs said caster wheel's rotation when a downward force is exerted on the upper rear portion of said toggle pedal surface, the motion of said toggle pedal causes a lever action to be exerted on said connector arms which cause a second lever action on said brake arm, while simultaneously compressing the hinge spring, said connector arms pivots into position where the first end of said connector arms contacts a tension pin placed through the sides of said brake housing at the point of maximum travel of said connector arms, said brake arm exerts a third lever action through said brake foot travel adjuster rod causing said brake foot to frictionally engage said caster wheel; disengagement of said brake foot from said caster wheel is accomplished when a downward force is exerted on the front upper portion of said toggle pedal, at such time said connector arms and said brake arm acting through said brake foot travel adjuster rod are forced to move said brake foot away from said wheel reversing the original action, the disengagement is assisted by the expansion of said hinge spring.

2. The shopping cart of claim 1 wherein a caster mounting bracket system comprises a variable length support bracket and a mechanical worm clamp, said variable length support bracket is systematically perforated for mechanically varying its functional length between the first end and the second end thereof, said variable length support bracket is attached at its first end to the right side of said brake housing and its second end is adjustably attached to said mechanical worm clamp, further said mechanical worm clamp is attached to the left side of said brake housing.

3. The shopping cart of claim 2 wherein said brake housing comprises an elongated channel having two sides and first and second ends, said first end attaches to said variable length mounting bracket on the right side and attaches to the mechanical worm clamp on the left side, further said first end of said brake housing is configured to be connected to a caster frame, said second end thereof contains the braking mechanism which is located and buttressed between each side of said brake housing, further attached to said second end of said brake housing is a dirt shield which is configured to enclose the braking mechanism within said brake housing, said dirt shield having a cavity which allows said brake foot to pass through said dirt shield and to frictionally engage the wheel.

4. The shopping cart of claim 3 wherein the variable length bracket having first and second ends, with said first end of said bracket riveted to the right side of the first end of said brake housing, said variable length bracket wraps around said caster at its upper most latitude and said second end of said bracket mechanically attaches to said worm clamp which secures said bracket by the screw force of said worm clamp acting in association with the perforations in said bracket, said worm clamp is attached to the left side of the first end of said brake housing, thereby said first end of said brake housing is mechanically secured to the caster frame by the mechanically generated force of said caster mounting variable length bracket and said worm clamp.

* * * * *